(12) United States Patent
Chen et al.

(10) Patent No.: US 12,509,943 B2
(45) Date of Patent: Dec. 30, 2025

(54) COMBINED DRILLING SYSTEM WITH DOUBLE ROTARY DRIVING DEVICES AND CONTROL METHOD THEREFOR

(71) Applicant: CCTEG ChongQing Research Institute Co., Ltd., ChongQing (CN)

(72) Inventors: Hang Chen, ChongQing (CN); Dezhong Xin, ChongQing (CN); Jun Wan, ChongQing (CN); Lin Yang, ChongQing (CN); Xiaohua Liu, ChongQing (CN); Yuqing Xiao, ChongQing (CN); Jian Pu, ChongQing (CN); Shizhai Zhang, ChongQing (CN); Min Tang, ChongQing (CN); Jinjun Lv, ChongQing (CN); Zhengang Ma, ChongQing (CN); Yuan Wan, ChongQing (CN); Xin Dou, ChongQing (CN); Fujia Zhou, ChongQing (CN); Xing Wang, ChongQing (CN); Shiping Lu, ChongQing (CN); Keyu Chen, ChongQing (CN); Yiting Liu, ChongQing (CN)

(73) Assignee: CCTEG Chongqing Research Institute Co., Ltd., Chongqing (CN)

( * ) Notice: Subject to any disclaimer, the term of this patent is extended or adjusted under 35 U.S.C. 154(b) by 0 days.

(21) Appl. No.: 18/875,727

(22) PCT Filed: Sep. 21, 2023

(86) PCT No.: PCT/CN2023/120217
§ 371 (c)(1),
(2) Date: Mar. 20, 2025

(87) PCT Pub. No.: WO2025/043789
PCT Pub. Date: Mar. 6, 2025

(65) Prior Publication Data
US 2025/0305362 A1    Oct. 2, 2025

(30) Foreign Application Priority Data

Aug. 28, 2023 (CN) .......................... 202311093097.0

(51) Int. Cl.
*E21B 3/02* (2006.01)
*E21B 7/04* (2006.01)
*E21B 44/00* (2006.01)

(52) U.S. Cl.
CPC ................ *E21B 3/02* (2013.01); *E21B 7/04* (2013.01); *E21B 44/00* (2013.01)

(58) Field of Classification Search
CPC ............... E21B 44/00; E21B 7/04; E21B 3/02
See application file for complete search history.

(56) References Cited

U.S. PATENT DOCUMENTS

| 2013/0068490 A1* | 3/2013 | Van Zee | E21B 17/18 173/40 |
| 2013/0186662 A1* | 7/2013 | Argent | E21B 3/022 173/47 |

(Continued)

FOREIGN PATENT DOCUMENTS

| CN | 103061669 A | 4/2013 |
| CN | 112983251 A | 6/2021 |

(Continued)

OTHER PUBLICATIONS

Office Action of corresponding CN application 202311093097.0, published on May 25, 2024.

(Continued)

*Primary Examiner* — Nathaniel C Chukwurah
(74) *Attorney, Agent, or Firm* — Wang Law Firm, Inc.

(57) ABSTRACT

The present invention relates to a combined drilling system with double rotary driving devices and a control method, belonging to the technical field of coal mine drills. The other end of a driving shaft in the gearbox connects to an adjuster, which includes a transmission shaft, fixed toothed disk, moving toothed disk, rotary seat, end cover, and a rotary speed reducer with a self-locking function. One end of the transmission shaft is fixedly connected to the driving shaft. The fixed and moving toothed disks are sheathed on the transmission shaft, with the fixed toothed disk engaged with the moving toothed disk through skewed teeth. The moving (Continued)

toothed disk is rotationally connected and can slide axially along the transmission shaft. The rotary seat is fixedly connected to the moving toothed disk, while the rotary speed reducer's output disk is coaxially fixed to the rotary seat, enabling controlled rotation.

10 Claims, 5 Drawing Sheets

(56) References Cited

U.S. PATENT DOCUMENTS

2016/0069136 A1* 3/2016 Metcalf ................. E21B 15/04
175/57
2017/0321807 A1* 11/2017 Walker .................. E21B 21/02
2021/0172312 A1 6/2021 Tao et al.

FOREIGN PATENT DOCUMENTS

CN 113833419 A 12/2021
CN 220451754 U 2/2024

OTHER PUBLICATIONS

Notice of Grant of Patent Right of corresponding CN application 202311093097.0, published on Jun. 3, 2024.
The grant claims of corresponding CN application 202311093097.0.

* cited by examiner

COMBINED DRILLING SYSTEM WITH DOUBLE ROTARY DRIVING DEVICES AND CONTROL METHOD THEREFOR

FIELD OF INVENTION

The present invention belongs to the technical field of coal mine drills, and relates to a combined drilling system with double rotary driving devices and a control method therefor.

BACKGROUND ART OF THE INVENTION

Most power heads of existing directional drills have only one power plant, i.e., a main motor, rotary power required for drilling rotation drive, toolface azimuth adjustment, etc. is provided by the main motor, and in sliding drilling, a device such as a mud pump is used to provide a driving medium with a certain pressure to a downhole motor to realize rotary cutting. Therefore, the power heads of the existing directional drills essentially have only one kind of rotary power provided by the main motor. However, the power heads of the existing directional drills can only achieve high-speed rotation, and no special power device is provided to drive drill pipes to rotate slowly. The toolface azimuth adjustment of the power heads depends on the main motor to drive the drill pipes to rotate, the rotation speed is high, and the moment of inertia of a transmission system is large, resulting in poor control accuracy and low adjustment efficiency. In a drilling process, a number of drill pipes are certainly in thread connection in a hole, so that only the main motor can be used to drive a main shaft and the drill pipes to rotate forward during toolface azimuth adjustment, and reverse rotation is likely to loosen the thread connection of the drill pipes in the hole, resulting in a bit drop accident. According to a requirement of coal mine drilling speed, the drill pipes are driven by the main motor to rotate at a high speed, and even at a low speed of as high as about 50 r/min (300°/s), so the adjustment accuracy of the system is very low. In addition, a power head transmission system (a main shaft, a gear, etc.) has a large mass and a large inertia, and usually cannot be accurately stopped when toolface azimuth adjustment is completed. Once a preset azimuth is missed, about one circle of forward rotation must be conducted for readjustment, and the process is repeated, resulting in that the adjustment efficiency is very low and not accurate enough. CN103061669B is a typical representative of the prior art. First, a power head thereof is not provided with an angle adjustment device that can drive the power head to rotate slowly and accurately; second, a brake device has a single function, does not have an angle adjustment function, and adopts a mode of a traditional friction plate, which comprises numerous internal vulnerable parts and requires to replace the parts frequently for maintenance.

Therefore, it is an urgent need for a combined drilling system which can provide a rotary driving device capable of accurately adjusting a toolface azimuth and having a braking function on the basis that rotation power is provided by a main motor, and a control method for the combined drilling system.

DISCLOSURE OF THE INVENTION

In view of this, the purpose of the present invention is to provide a combined drilling system with double rotary driving devices and a control method therefor to solve the problem of low toolface azimuth adjustment efficiency caused by that a power head of an existing directional drill has only one rotary power plant and a rotation angle of the power head of the existing directional drill cannot be controlled accurately.

To achieve the above purpose, the present invention provides the following technical solution:

A combined drilling system with double rotary driving devices, comprising a main motor, a gearbox, a main shaft, drill pipes and a downhole motor, wherein the gearbox is provided with a driving shaft, one end of the driving shaft is connected with the main motor, the driving shaft is engaged with the main shaft through a gear in the gearbox, the drill pipes are circumferentially and fixedly connected with the main shaft, and the downhole motor is arranged at a front end of the drill pipes to serve as a downhole drilling actuator; the key is that: the other end of the driving shaft is connected with an adjuster through the gearbox;

The adjuster comprises a transmission shaft, a fixed toothed disk, a moving toothed disk, a rotary seat and a rotary speed reducer with a self-locking function, one end of the transmission shaft is circumferentially and fixedly connected with the driving shaft, the fixed toothed disk and the moving toothed disk are sheathed on the transmission shaft, the fixed toothed disk is engaged with the moving toothed disk through skewed teeth, the fixed toothed disk is circumferentially and fixedly connected with the transmission shaft, the moving toothed disk is rotationally connected with the transmission shaft, and the moving toothed disk can slide along an axial direction of the transmission shaft;

The rotary seat is sheathed on and circumferentially and fixedly connected with the moving toothed disk, and an output disk of the rotary speed reducer is coaxially and fixedly connected with the rotary seat to transfer rotation of the output disk of the rotary speed reducer to the moving toothed disk.

Further, the adjuster also comprises a driving piston and a connecting seat, the driving piston is sheathed on the transmission shaft and is located on one side of the fixed toothed disk away from the moving toothed disk, and one end of the driving piston away from the driving shaft is connected with the moving toothed disk;

The connecting seat is sheathed on the driving piston, an outer circle of the connecting seat is divided by three diameters, a middle section has a largest diameter, both end surfaces of the middle section are connected with the gearbox and the rotary speed reducer, respectively, to realize relative axial positioning among the gearbox, the connecting seat and the rotary speed reducer, and an inner diameter of the connecting seat is divided by three apertures, wherein the apertures of two sections away from the gearbox are matched with an outer diameter of the driving piston, and the two sections are sheathed on the driving piston;

The driving piston is a two-stage stepped shaft, a sealing groove is formed in an outer circle of a small-diameter end of the driving piston, a sealing ring is installed in the sealing groove and is matched with a corresponding position of the connecting seat sheathed on the driving piston to form a first seal, an outer circle of a large-diameter end is matched with a sealing ring installed at a corresponding position of the connecting seat to form a second seal, a sealing cavity located between the driving piston and the connecting seat is formed between the first seal and the second seal, an oil inlet communicated with the sealing cavity is arranged on the connecting seat, and the moving toothed disk is pushed by the driving piston to move in a direction away from the fixed toothed disk under the action of hydraulic oil entering the sealing cavity through the oil inlet to enable the moving toothed disk to slide along the axial direction of the transmission shaft.

Further, the adjuster also comprises an end cover, the other end of the transmission shaft is rotationally connected in the end cover, the moving toothed disk is a disk-like part with a central through hole, the central through hole is a stepped through hole, one side of the stepped through hole facing the end cover is a large-diameter through hole, the moving toothed disk is sheathed on and slidably connected with the end cover through the large-diameter through hole, one end surface of the moving toothed disk facing the driving piston is provided with first skewed teeth distributed circumferentially, the fixed toothed disk is provided with second skewed teeth engaged with the first skewed teeth, and springs are arranged between an inner end surface of the large-diameter through hole and one end surface of the end cover opposite to the inner end surface to make the first skewed teeth and the second skewed teeth engaged under a thrust force of the springs;

- An outer circular surface of the moving toothed disk is provided with lug bosses distributed uniformly, the rotary seat is sheathed on the moving toothed disk and has grooves matched with the lug bosses to be circumferentially and fixedly connected with the moving toothed disk, and one end of the rotary seat is provided with a rotary speed reducer connecting disk which is fixedly connected with the output disk of the rotary speed reducer to transfer the rotation of the output disk of the rotary speed reducer to the moving toothed disk.

Further, a transmission piston is also arranged between the driving piston and the moving toothed disk, the transmission piston is sheathed on and slidably connected with the transmission shaft, one end of the transmission piston is connected with the driving piston, and the other end is connected with the moving toothed disk to transmit a thrust force of the driving piston.

Further, the rotary seat is cylindrical, and one end of the rotary seat away from the rotary speed reducer connecting disk is provided with an end cover connecting disk which is fixedly connected with the end cover.

Further, the fixed toothed disk is provided with a toothed disk and a fixed shaft located in a center of the toothed disk, the second skewed teeth are arranged on the toothed disk, the fixed shaft is inserted into the central through hole of the moving toothed disk, and a keyway is provided in the fixed shaft to enable the fixed toothed disk to be circumferentially and fixedly connected with the transmission shaft through key connection.

Further, the end cover has a three-stage stepped hollow disk-like structure, which is sheathed on the transmission shaft through a bearing, a maximum outer diameter section of the end cover is provided with a flange which is connected with the rotary seat, the maximum outer diameter section is located on one end away from the driving shaft, an intermediate diameter section is used for carrying the rotary seat and limiting an axial movement distance of the moving toothed disk, a minimum diameter section is axially and slidably connected with the large-diameter through hole of the moving toothed disk, and one end surface of the minimum diameter section is provided with a plurality of spring mounting holes which are used for mounting the springs and distributed circumferentially and uniformly.

Further, the driving shaft is arranged in the gearbox, one end surface of the middle section of the connecting seat is connected with the gearbox, one section of the connecting seat close to the gearbox is inserted into the gearbox and is used as an axial stop of the bearing sheathed on the driving shaft, and one section of the connecting seat close to the rotary speed reducer is extended towards an inner part of the rotary speed reducer to be used for installation and guidance of the rotary speed reducer.

Further, one end of the drill pipes is connected with a medium pump, a fluid medium is input to the downhole motor by the medium pump through the drill pipes, and the rotary speed reducer is connected with an adjusting motor which drives the rotary speed reducer to rotate.

A control method for the combined drilling system with double rotary driving devices; the key is that: the combined drilling system with double rotary driving devices mentioned above is used, and states of the adjuster, the main motor and the downhole motor are combined, so as to make the combined drilling system have four working conditions: sliding directional drilling, accurate angle adjustment, rotary drilling and combined drilling; the specific steps are as follows:

Sliding Directional Drilling:

In the working condition of sliding directional drilling, sliding the moving toothed disk axially to make the fixed toothed disk engaged with the moving toothed disk through skewed teeth, thus to make the adjuster in a locked condition and make the main shaft cannot rotate under the drive of the main motor, and driving the downhole motor to rotate, thus to drive a drill bit to rotate and implement sliding directional drilling;

Toolface Azimuth Adjustment:

In the working condition of toolface azimuth adjustment, sliding the moving toothed disk axially to make the fixed toothed disk engaged with the moving toothed disk through skewed teeth, thus to make the adjuster in the locked condition and make the main shaft cannot rotate under the drive of the main motor, and driving the transmission shaft to rotate by the rotary speed reducer, thus to drive the driving shaft to rotate by the transmission shaft, drive the main shaft and the drill pipes to rotate by the transmission shaft through the gearbox, and realize toolface azimuth adjustment;

Rotary Drilling:

In the working condition of rotary drilling, sliding the moving toothed disk axially to make the fixed toothed disk separated from the moving toothed disk, thus to make the adjuster in an unlocked condition and enable the main motor to drive the main shaft and the drill pipes to rotate and implement rotary drilling;

Combined Drilling:

In the working condition of combined drilling, sliding the moving toothed disk axially to make the fixed toothed disk separated from the moving toothed disk, thus to make the adjuster in the unlocked condition and enable the main motor to drive the main shaft and the drill pipes to rotate, and driving the downhole motor to rotate at the same time, thus to drive the drill bit to rotate and implement combined drilling;

The present invention has the following beneficial effects:

In the combined drilling system with double rotary driving devices provided by the present invention, one end of the driving shaft away from the main motor is connected with the adjuster with functions of accurate angle adjustment, locking and anti-rotation, thus the toolface azimuth is adjusted accurately and efficiently, and rebounding and rotation of the main shaft of the power head caused by elastic deformation of the drill pipes can be prevented, which solves the problems of lack of a special toolface azimuth adjustment device, low precision and low efficiency of track adjustment, and being difficult to realize automatic directional drilling in the prior art; at the same time, a driving force required for toolface azimuth adjustment is greatly reduced, a good energy saving effect is achieved, the structure of a rotary brake device of the main motor is simplified, and the functions of a large number of internal parts are transferred to an external rotary speed reducer, which greatly reduces difficulty of maintenance, and reduces consumption of wearing parts.

In addition, the combined drilling system is provided with two rotary driving devices, i.e., the main motor and the adjusting motor, one motor outputs a higher speed and the other outputs a lower speed; and with the downhole motor to drive the drill bit directly, the control method for the combined drilling system can meet requirements of various working conditions by combining the states of the main motor, the adjusting motor and the downhole motor, and is more suitable for automated drilling equipment.

Other advantages, objectives and features of the present invention will be illustrated in the following description to some extent, and will be apparent to those skilled in the art based on the following investigation and research to some extent, or can be taught from the practice of the present invention. The objectives and other advantages of the present invention can be realized and obtained through the following description.

DESCRIPTION OF THE DRAWINGS

To enable the purpose, the technical solution and the advantages of the present invention to be more clear, the present invention will be preferably described in detail below in combination with the drawings, wherein.

Figure 1:
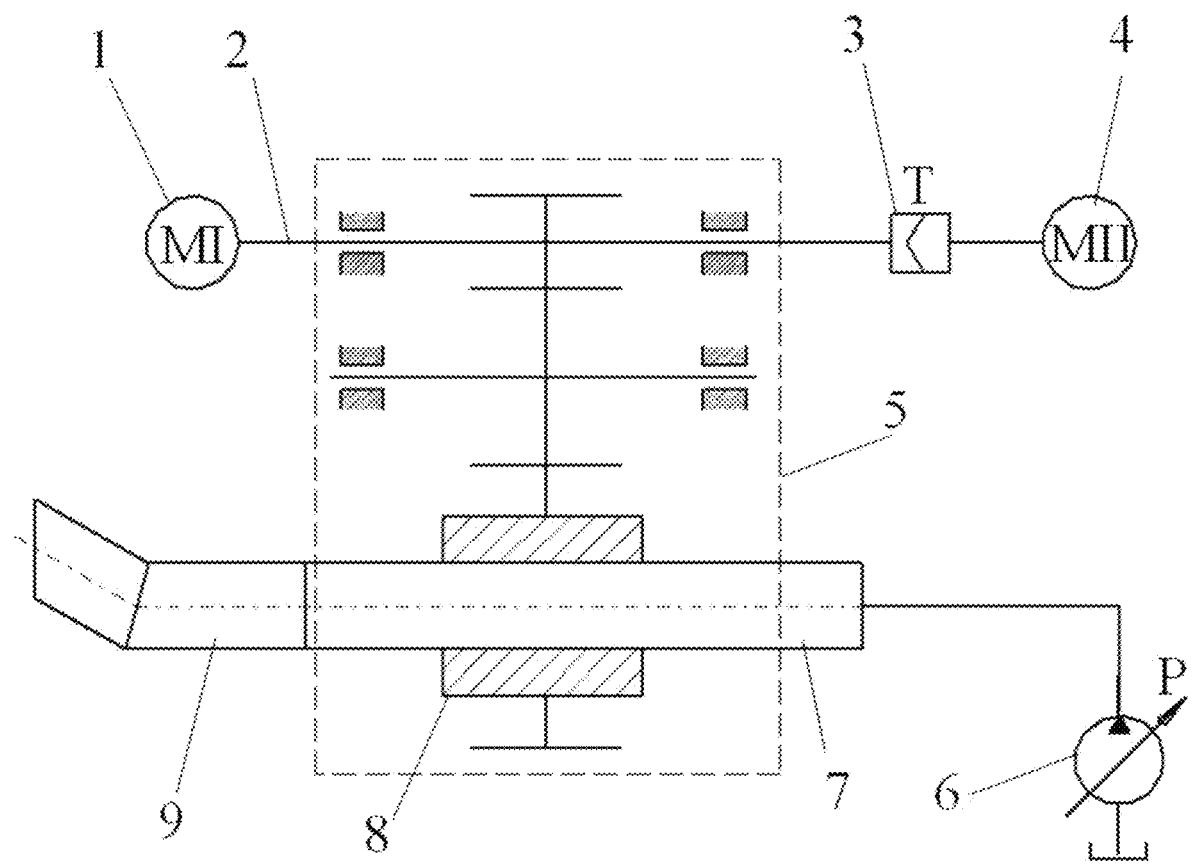
FIG. 1 is a schematic diagram of a combined drilling system with double rotary driving devices.

Reference signs: 1—main motor, 2—driving shaft, 3—adjuster, 301—transmission shaft, 302—driving piston, 302*a*—sealing groove, 302*b*—outer circle of large-diameter end, 303—rotary speed reducer, 304—transmission piston, 305—fixed toothed disk, 305*a*—toothed disk, 305*b*—fixed shaft, 306—moving toothed disk, 306*a*—lug boss, 306*b*—first skewed tooth, 307—end cover, 307*a*—maximum outer diameter section, 307*b*—intermediate diameter section, 307*c*—minimum diameter section, 307*d*—spring mounting hole, 308—bearing gland, 309—spring, 310—rotary seat, 310*a*—rotary speed reducer connecting disk, 310*b*—end cover connecting disk, 310*c*—groove, 311—flat key, 4—adjusting motor, 5—gearbox, 6—medium pump, 7—drill pipe, 8—main shaft, 9—downhole motor.

DETAILED DESCRIPTION OF THE INVENTION

Embodiments of the present invention are described below through specific embodiments. Those skilled in the art can understand other advantages and effects of the present invention easily through the disclosure of the description. The present invention can also be implemented or applied through additional different specific embodiments. All details in the description can be modified or changed based on different perspectives and applications without departing from the spirit of the present invention. It should be noted that the figures provided in the following embodiments only exemplarily explain the basic conception of the present invention, and if there is no conflict, the following embodiments and the features in the embodiments can be mutually combined.

Wherein the drawings are only used for exemplary description, are only schematic diagrams rather than physical diagrams, and shall not be understood as a limitation to the present invention. In order to better illustrate the embodiments of the present invention, some components in the drawings may be omitted, scaled up or scaled down, and do not reflect actual product sizes. It should be understandable for those skilled in the art that some well-known structures and description thereof in the drawings may be omitted.

Same or similar reference numerals in the drawings of the embodiments of the present invention refer to same or similar components. It should be understood in the description of the present invention that terms such as "upper", "lower", "left", "right", "front" and "back" indicate direction or position relationships shown based on the drawings, and are only intended to facilitate the description of the present invention and the simplification of the description rather than to indicate or imply that the indicated device or element must have a specific direction or constructed and operated in a specific direction, and therefore, the terms describing position relationships in the drawings are only used for exemplary description and shall not be understood as a limitation to the present invention; for those ordinary skilled in the art, the meanings of the above terms may be understood according to specific conditions.

Figure 2:
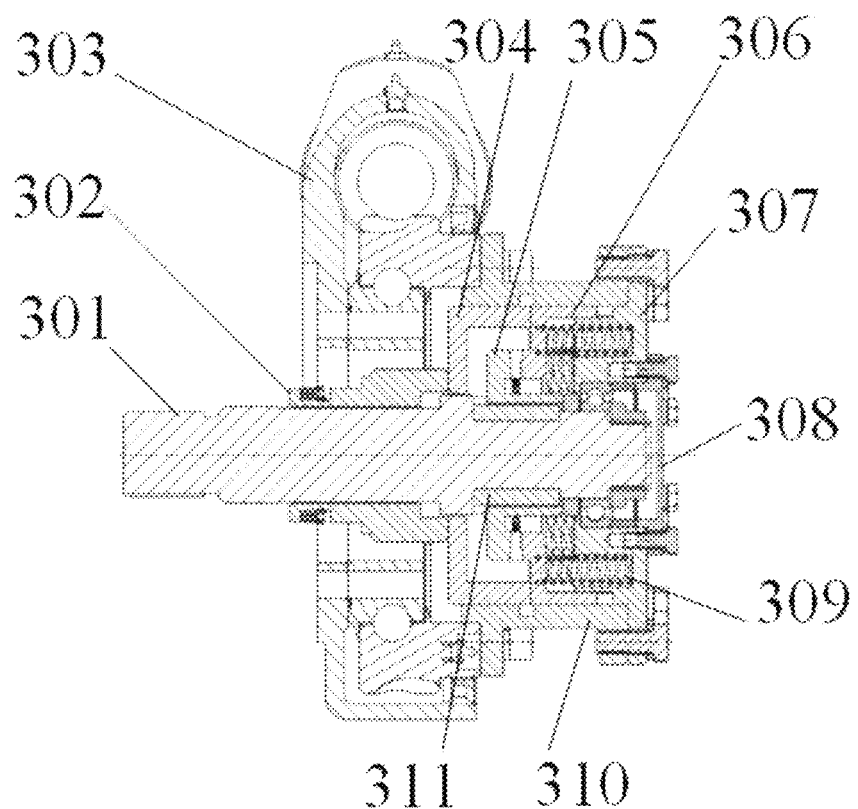
FIG. 2 is a structural schematic diagram of an adjuster in the present invention.
Figure 3:
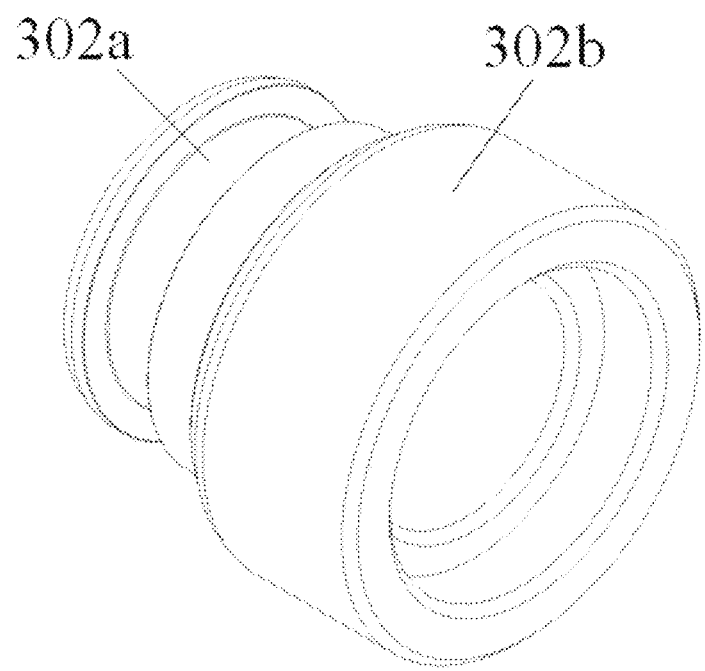
FIG. 3 is a structural schematic diagram of a driving piston of an adjuster in the present invention.
Figure 4:
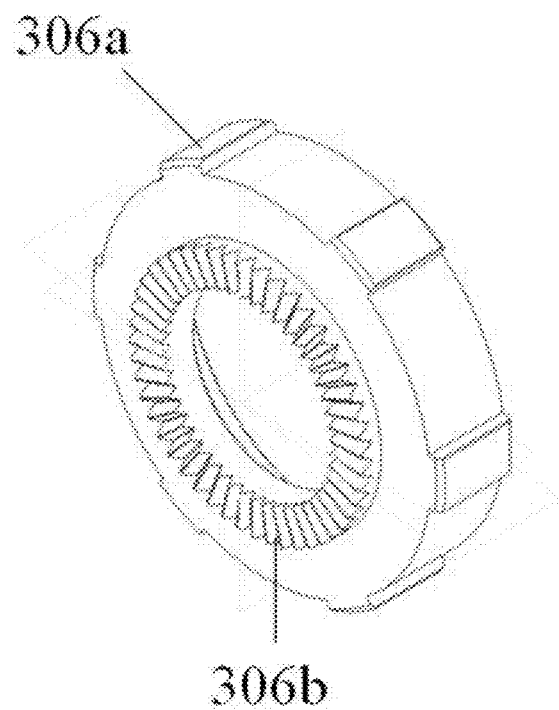
FIG. 4 is a structural schematic diagram of a moving toothed disk of an adjuster in the present invention.
Figure 5:
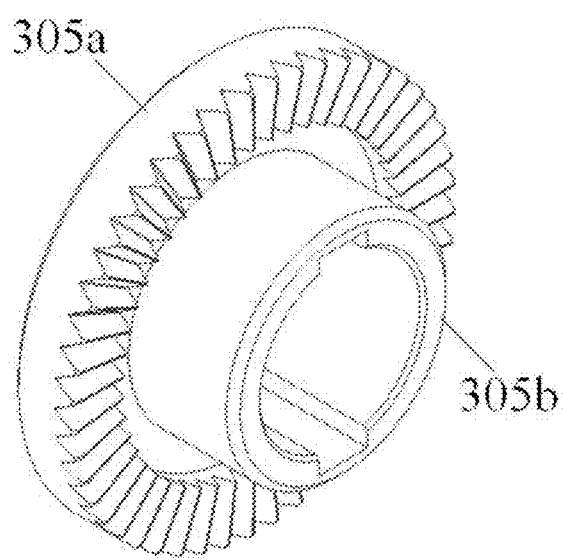
FIG. 5 is a structural schematic diagram of a fixed toothed disk of an adjuster in the present invention.
Figure 6:
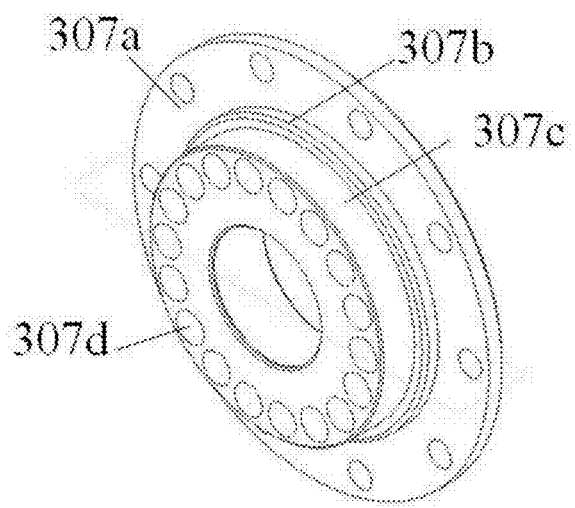
FIG. 6 is a structural schematic diagram of an end cover of an adjuster in the present invention.
Figure 7:
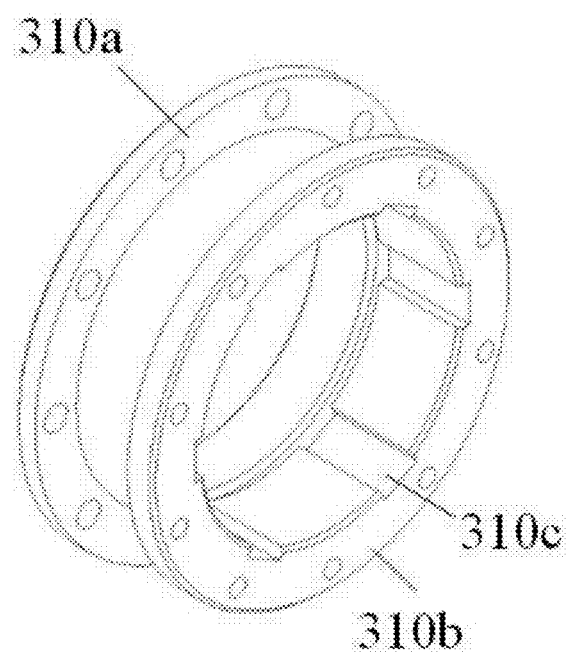
FIG. 7 is a structural schematic diagram of a rotary seat of an adjuster in the present invention.
Figure 8:
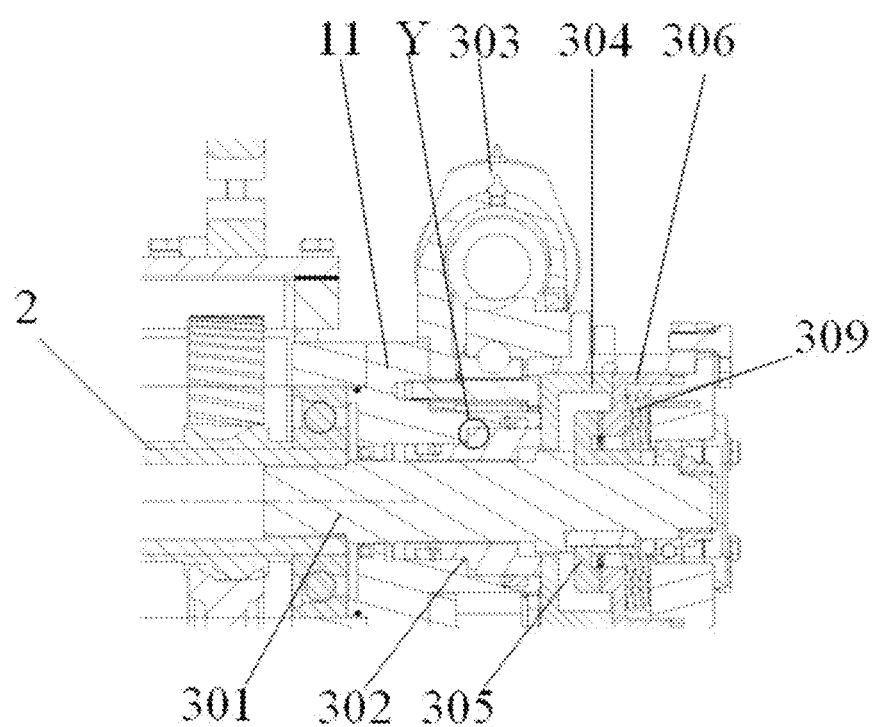
FIG. 8 is a local amplified structural schematic diagram of an adjuster in the present invention.

Referring to FIGS. 1-8 which show a combined drilling system with double rotary driving devices, comprising a main motor 1, a driving shaft 2, an adjuster 3, an adjusting motor 4, a gearbox 5, a medium pump 6, drill pipes 7, a main shaft 8 and a downhole motor 9, wherein the main motor 1 is a main power source driving the drill pipes 7 to rotate at a high speed and can drive the drill pipes 7 to rotate rapidly, and rotation power required for rotary drilling, combined drilling, and drill pipe connection and disconnection is from the main motor. The main motor 1 can be various rotary power driven devices, for example: a hydraulic motor, an electric motor, etc. Preferably, according to complex working conditions and explosion-proof requirements of a coal mine, the main motor 1 in the present embodiment is preferably a hydraulic motor. One end of the driving shaft 2 is connected with the main motor 1, the other end is connected with the adjuster 3, the adjusting motor 4 is connected with the adjuster 3 and used for driving the adjuster 3, the driving shaft 2 is engaged with the main shaft 8 through a gear in the gearbox 5, the main shaft 8 is a motion output shaft of the gearbox 5 and is connected with the drill pipes 7 through a clamping device or a joint to transfer power output by the main motor 1 or the adjusting motor 4 to the drill pipes 7, the downhole motor 9 is arranged at a head end of the drill pipes 7 to serve as a downhole drilling actuator, and the medium pump 6 is connected with a tail end of the drill pipes 7 to serve as a power source driving the downhole motor 9 to rotate, and input a fluid medium with a certain pressure to the downhole motor 9 through the main shaft 8 and a plurality of drill pipes 7 connected (or by being directly connected with the drill pipes 7) to drive the downhole motor 9 to rotate.

The gearbox 5 is a variable speed transmission mechanism of the system, which is mainly used for transferring rotation speed and torque of the main motor 1 and the adjusting motor 4 to the main shaft 8 in a certain transmission ratio, thus to meet the requirements of drilling as well as drill pipe connection and disconnection. According to existing hydraulic motor technology and drilling needs, the gearbox 5 is generally a gearbox with decelerating, torque increasing and transferring functions.

A structure with one end surface engaged by a toothed disk is adopted in the adjuster 3, and with engagement and separation of the toothed disk, motion of the adjusting motor 4 can be controlled whether to be transferred to the main shaft 8 and the drill pipes 7 through the gearbox 5. In addition, the adjuster 3 has a rotation self-locking function, a self-locking torque of the adjuster 3 is greater than an output torque of the main motor, and a transmission ratio of the adjuster 3 is greater than that of the gearbox 5, so that the drill pipes 7 are rotated slowly, and the adjuster 3, when engaged, can prevent the rotation of the main motor 1 from being transferred to the main shaft 8 and the drill pipes 7 through the gearbox 5.

The key of the system is the adjuster 3, and the adjuster 3 comprises a transmission shaft 301, a rotary seat 310, a connecting seat 11, a bearing gland 308 and springs 309; a driving piston 302, a transmission piston 304, a fixed toothed disk 305, a moving toothed disk 306 and an end cover 307 which are sheathed on the transmission shaft 301 from left to right in sequence; and a rotary speed reducer 303 with a self-locking function. A transmission ratio of the rotary speed reducer 303 is greater than that of the gearbox 5; a left end of the transmission shaft 301 is provided with a spline which is inserted into the driving shaft 2 of the gearbox 5, and the driving shaft 2 is provided with a keyway matched with the spline on the transmission shaft 301, thus to make the transmission shaft 301 form a spline connection with the driving shaft 2 and then form a circumferential and fixed connection; and a right end of the transmission shaft 301 is connected with the fixed toothed disk 305 sheathed on the transmission shaft 301 through a flat key 311 to form a circumferential and fixed connection, and is rotationally connected in the end cover 307 through a bearing, the end cover 307 is located on one side of the fixed toothed disk 305 away from the driving shaft 2, i.e., located on a right side of the fixed toothed disk 305, distance sleeves are arranged on both sides of the bearing, the bearing gland 308 which is fixedly connected with the end cover 307 by bolts is arranged on one side of the end cover 307 away from the fixed toothed disk 305, thus to position the bearing.

The driving piston 302 is a hollow two-stage stepped shaft and is sheathed on the transmission shaft 301, a sealing groove 302a is formed in an outer circle of a small-diameter end, a sealing ring is installed in the sealing groove 302a and is matched with an inner hole in a corresponding position of the connecting seat 11 sheathed on the driving piston 302 to form a first seal, and an outer circle 302b of a large-diameter end is matched with a sealing ring installed in a sealing ring mounting groove in a corresponding position of the connecting seat 11 to form a second seal; and a sealing cavity Y located between the driving piston 302 and the connecting seat 11 is formed in the first seal and the second seal, an oil inlet communicated with the sealing cavity Y is arranged on the connecting seat 11, hydraulic oil enters the sealing cavity Y through the oil inlet on the connecting seat 11 to push the driving piston 302 to move from the small-diameter end to the large-diameter end, and the small-diameter end of the driving piston 302 is an end close to the driving shaft 2.

Preferably, a two-stage stepped inner hole is formed in the driving piston 302, one side facing the end cover 307 is a large-diameter inner hole, and the transmission shaft 301 is correspondingly provided with a shaft shoulder matched with the two-stage stepped inner hole to limit a displacement distance of the driving piston 302 in an axial direction, thus to prevent the driving piston 302 from moving beyond limit.

The transmission piston 304 is a disk-like part with a central through hole and is sheathed on the transmission shaft 301, a left end of the transmission piston 304 is in contact and connected with the large-diameter end of the driving piston 302, a right end of the transmission piston 304 is in contact and connected with the moving toothed disk 306, and a main function of the transmission piston 304 is to transfer a driving force of the driving piston 302 (the driving force of displacement to the right end) to the moving toothed disk 306, thus to make the moving toothed disk 306 move towards the end cover 307.

A main body of the moving toothed disk 306 is a disk-like part with a central through hole, a stepped through hole is formed in the middle for the transmission shaft 301 and a fixed shaft 305b of the fixed toothed disk 305 to pass through, one side of the through hole facing the end cover is a large-diameter through hole, an inner end surface of the large-diameter through hole is used for withstanding an end thrust force of the springs 309, one end surface of the moving toothed disk 306 facing one side of the transmission piston 304 is provided with first skewed teeth 306b distributed circumferentially, an outer circular surface of the moving toothed disk 306 is provided with lug bosses 306a distributed uniformly, and the lug bosses 306a are matched with grooves 310c in an inner hole of the rotary seat 310 sheathed thereon, thus to transfer rotation and torque of the rotary speed reducer 303 connected with the rotary seat 310.

The fixed toothed disk 305 is provided with a toothed disk 305a and the fixed shaft 305b located in a center of the toothed disk 305a, the fixed shaft 305b is a hollow shaft, an inner through hole thereof is provided with a keyway which can form a key connection between the fixed toothed disk 305 and the transmission shaft 301, thus to realize a circumferential and fixed connection to limit rotation between the fixed toothed disk 305 and the transmission shaft 301, the fixed shaft 305b is inserted into the central through hole of the moving toothed disk, and one end surface of the toothed disk 305a facing the moving toothed disk 306 is provided second skewed teeth which are engaged correspondingly with the first skewed teeth 306b of the moving toothed disk 306 and distributed circumferentially. Specifically, the fixed toothed disk 305 is fixed on the transmission shaft 301 through the flat key 311 to prevent relative rotation of the fixed toothed disk 305 and the transmission shaft 301. Both ends of the fixed toothed disk 305 are axially stopped by the shaft shoulder of the transmission shaft 301, the distance sleeves, etc.

A main body of the end cover 307 has a three-stage stepped hollow disk-like structure, which is sheathed on the transmission shaft 301 through a bearing, a maximum outer diameter section 307a is provided with a flange which is connected with the rotary seat 310 sheathed on the moving toothed disk 306 and a flange which is connected with the bearing gland 308, respectively, an intermediate diameter section 307b is used for matching with the rotary seat 310 and limiting an axial movement distance of the moving toothed disk 306, a minimum diameter section 307c is used for matching with the moving toothed disk 306, i.e., the large-diameter through hole in the moving toothed disk 306 is matched with an outer circle of the minimum diameter section 307c to form an axial sliding connection, one end surface of the minimum diameter section is provided with a plurality of spring mounting holes 307d which are used for mounting the springs 309 and distributed circumferentially and uniformly, the minimum diameter section 307c is one end of the end cover 307 close to the driving shaft 2, and the bearing gland 308 is fixed on an outer side of the end cover 307 by bolts and used for axially limiting the bearing. The springs 309 are installed between the end cover 307 and the moving toothed disk 306 through the spring mounting holes 307d to provide a thrust force for the moving toothed disk 306 towards the fixed toothed disk 305.

A main body of the rotary seat 310 is cylindrical, which is sheathed on an outer side of the moving toothed disk 306, a left end of the rotary seat 310 is provided with a rotary speed reducer connecting disk 310a which is used for connecting an output disk of the rotary speed reducer 303 with a self-locking function, a right end of the rotary seat 310 is provided with an end cover connecting disk 310b which is used for installing the end cover 307, and the intermediate diameter section 307b in the end cover 307 is matched and connected with an inner cavity of the rotary seat 310 to leave a space for mounting the moving toothed disk 306; and the rotary seat 310 has a through hole in an inner part and grooves 310c corresponding to the lug bosses 306a of the moving toothed disk 306, a circumferential and fixed connection is formed between the rotary seat 310 and the moving toothed disk 306 by the lug bosses 306a and the grooves 310c, and the moving toothed disk 306 can be axially displaced relative to the rotary seat 310.

The connecting seat 11 is used for connecting the adjuster 3 with the gearbox 5, the gearbox 5 is sheathed on the driving shaft 2 and is mainly used for transferring torque and rotation of the driving shaft 2 to the main shaft 8, the connecting seat 11 is a hollow cylinder, an outer circle of the connecting seat 11 is divided by three diameters, wherein a middle section has a largest diameter to form a middle bulge, both end surfaces of the middle section are fitted and fixedly connected with the gearbox 5 and the rotary speed reducer 303, respectively, to realize relative axial positioning among the three elements, a left section (an end close to the driving shaft 2) is inserted into a cavity of the gearbox 5 and is connected with a bearing sheathed on the driving shaft 2 to be used as an axial stop of the bearing sheathed on the driving shaft 2, and a sealing groove is formed in the left section to seal the cavity of the gearbox 5 by installing a sealing ring; and a right section is extended towards an inner part of the rotary speed reducer 303 to facilitate installation and guidance of the rotary speed reducer 303.

An inner diameter of the connecting seat 11 is divided by three apertures, wherein an inner diameter of a left inner section is matched with the transmission shaft 301 and has a sealing groove to conduct secondary sealing to the gearbox 5 by installing a sealing ring; and a middle inner section and a right inner section are matched with outer diameters of the two-stage stepped shaft of the driving piston 302, respectively, the right inner section has a sealing ring mounting groove and is provided with a sealing ring, i.e., the middle inner section and the right inner section are matched with the outer circle of the small-diameter end and the outer circle 302b of the large-diameter end of the driving piston 302, respectively, to form the first seal and the second seal, thus to form the sealing cavity Y, wherein a sealing groove 302a corresponding to the middle inner section and provided with the sealing ring is formed in the driving piston 302 to form the first seal, the right inner section having the sealing ring mounting groove and provided with the sealing ring is matched with the outer circle 302b of the large-diameter end to from the second seal, the sealing cavity Y located between the connecting seat 11 and the driving piston 302 is formed by the first seal and the second seal, the oil inlet is arranged on an outer surface of the connecting seat 11 in a position corresponding to the sealing cavity Y, and hydraulic oil enters the sealing cavity Y through the oil inlet on the connecting seat 11 to push the driving piston 302 to move towards the right end, thus to push the transmission piston 304 and the moving toothed disk 306, and further compress the springs 309 by the moving toothed disk 306, thereby disengaging the skewed teeth of the moving toothed disk 306 and the fixed toothed disk 305.

The rotary speed reducer 303 is sheathed on the right section of the connecting seat 11 and is fixedly connected with the middle section of the connecting seat 11, and the output disk (such as the toothed disk or a worm gear) of the rotary speed reducer 303 is fixedly connected with the rotary seat 310 by bolts, thus to limit relative rotation of the output disk of the rotary speed reducer 303 and the rotary seat 310. The rotary speed reducer 303 mainly has two functions: the first is to drive the driving shaft 2 by the transmission shaft 301 to rotate at a relatively low speed (compared with being driven by the main motor 1), and transfer the rotation by the gearbox 5 to accurately control an output rotation angle; the second is to prevent the main motor 1 from driving the driving shaft 2 to rotate, thus to realize locking and anti-rotation of the whole gearbox 5 in a locked condition because the rotary speed reducer 303 has a self-locking action and a self-locking torque of the rotary speed reducer 303 is greater than the output torque of the main motor 1.

Preferably, the rotary speed reducer 303 is a worm and gear rotary speed reducer with a self-locking function, i.e., the rotary speed reducer connecting disk 310a is connected with a worm gear which is used as the output disk in the worm and gear rotary speed reducer, and the worm gear is sheathed on the transmission shaft 301 through the connecting seat 11 and the driving piston 302, thus to ensure synchronous rotation of the worm gear and the rotary seat 310. A transmission ratio of an existing worm and gear rotary speed reducer can reach greater than 1:100, but the main shaft driven by the main motor 1 in the prior art (the main shaft is driven by the gearbox 5) has a minimum rotation speed of about 50 r/min (300°/s), and therefore, an output rotation speed of the main shaft can be controlled to be within $1/100$ (≤3°/s) of the prior art by the adjuster 3 through the worm and gear rotary speed reducer, which will be very conducive to accurate adjustment and timely stop, and greatly improve toolface azimuth adjustment accuracy and adjustment efficiency.

Specifically, the worm and gear rotary speed reducer comprises a driving source, a worm, a worm gear and a rotary support, the driving source is the adjusting motor 4, the worm in the worm and gear rotary speed reducer is driven by the adjusting motor 4 to drive the worm gear to rotate, thus to drive the rotary seat 310 and the moving toothed disk 306 to rotate and then drive the fixed toothed disk 305 and the transmission shaft 301 to rotate, the rotary support is sheathed on and fixedly with the connecting seat, the worm gear is rotationally connected with an outer circle of the rotary support through a raceway and is matched and connected with the worm, thus to achieve a purpose of making the output disk (i.e., the worm gear) of the rotary speed reducer coaxial with the rotary seat, and the driving source is connected with one end of the worm to drive the worm to rotate. As worm and gear transmission has a characteristic of reverse self-locking and can realize reverse self-locking, i.e., the worm gear can be driven by the worm, but the worm cannot be driven by the worm gear, the worm and gear rotary speed reducer has the self-locking function. The driving source is an electric motor or a hydraulic motor, and is preferred to be a hydraulic motor in the present embodiment in order to be suitable for complex coal mine downhole operations.

In other embodiments, the rotary speed reducer 303 is any one of the rotary speed reducers such as an RV speed reducer and a harmonic speed reducer, and a structure used as the output disk (or called a rotary disk) in the above-mentioned rotary speed reducer 303 is also fixedly connected with the rotary seat 310.

The adjuster 3 has two working conditions, and a working principle thereof is as follows:

Locked condition: no pressure oil enters the sealing cavity Y formed between the driving piston 302 and the connecting seat 11 from the oil inlet of the connecting seat 11, the driving piston 302 is not driven by externally supplied pressure oil, and an axial force towards the fixed toothed disk 305 is always exerted by the springs 309 onto the moving toothed disk 306 to keep the skewed teeth of the moving toothed disk 306 engaged with the skewed teeth of the fixed toothed disk 305; at this time, the main motor 1 and the driving shaft 2 are connected with the rotary speed reducer 303 through the transmission shaft 301, the fixed toothed disk 305, the moving toothed disk 306 and the rotary seat 310, and the rotary speed reducer 303 has a self-locking function within a working capacity thereof (i.e., the self-locking torque of the rotary speed reducer 303 is greater than the output torque of the main motor 1), thus to lock a transmission system of the gearbox 5, and the main motor 1 cannot transfer motion through the gearbox 5; however, if the rotary speed reducer 303 is driven at this time, the driving shaft 2 can be driven by the rotary speed reducer 303 to rotate at a relatively low speed (compared with being driven by the main motor 1), and the rotation and torque are transferred by the gearbox 5 to accurately control a rotation angle of the main shaft 8 and the drill pipes 7, thus to conduct accurate and efficient adjustment to the toolface azimuth.

Unlocked condition: pressure oil is injected into the sealing cavity Y between the driving piston 302 and the connecting seat 11 through the oil inlet of the connecting seat 11, the driving piston 302 is driven by a hydraulic force to push the transmission piston 304 and the moving toothed disk 306 to move in a direction away from the fixed toothed disk 305, at this time, the springs 309 are compressed by the moving toothed disk 306 and retract, the skewed teeth of the moving toothed disk 306 and the fixed toothed disk 305 are disengaged, and the self-locking action of the rotary speed reducer 303 cannot be transferred to the transmission shaft 301, the driving shaft 2 and the main motor 1. Therefore, the driving shaft 2 can be driven by the main motor 1 to rotate, thus to output rotation and torque by the gearbox 5.

The combined drilling system with double rotary driving devices can operate in four working conditions: sliding directional drilling, accurate angle adjustment, rotary drilling and combined drilling. The control method therefor is shown in the following table:

|  | Type of working condition | MI | MII | P |
|---|---|---|---|---|
| T = 1 | Sliding directional drilling | 0 | 0 | 1 |
|  | Toolface azimuth adjustment | 0 | 1 | 0 |
| T = 0 | Rotary drilling | 1 | 0 | 0 |
|  | Combined drilling | 1 | 0 | 1 |

In the table, T = 1 indicates that the adjuster 3 is in the locked condition, and T = 0 indicates that the adjuster 3 is in the unlocked condition;
MI = 1 indicates that the main motor 1 is hydraulically driven, and MI = 0 indicates that the main motor 1 is not hydraulically driven;
MII = 1 indicates that the adjusting motor 4 is hydraulically driven, and MII = 0 indicates that the adjusting motor 4 is not hydraulically driven;
P = 1 indicates that the medium pump 6 outputs a driving medium to the downhole motor 9, and P = 0 indicates that the medium pump 6 has no output.

The specific conditions of the above four working conditions are as follows:

(1) Sliding Directional Drilling

In the working condition of sliding directional drilling, the adjuster 3 is in the locked condition, and the main shaft 8 cannot be driven by the main motor 1 to rotate; and the downhole motor 9 is installed on a front end of a drill pipe at the foremost end. The fluid medium with a certain pressure is input to the downhole motor 9 by the medium pump 6 through the drill pipes 7 to drive the downhole motor 9 to rotate, and thus to drive the drill bit to rotate and implement sliding directional drilling.

(2) Toolface Azimuth Adjustment

In the working condition of toolface azimuth adjustment, the adjuster 3 is in the locked condition, and the main shaft 8 cannot be driven by the main motor 1 to rotate, but can only be driven by the rotary speed reducer 303 to rotate; at this time, the oil is not supplied to the main motor 1, but supplied to the power source adjusting motor 4 in the rotary speed reducer 303.

The transmission shaft 301 is driven by the rotary speed reducer 303 to rotate under the action of the adjusting motor 4, and the main shaft 8 and the drill pipes 7 are driven by the driving shaft 2 in the gearbox 5 to rotate, thus to achieve the toolface azimuth adjustment. Due to the large transmission ratio of the rotary speed reducer 303 and the transmission ratio of the gearbox 5, efficient and accurate toolface azimuth adjustment can be achieved by controlling the rotation speed of the rotary speed reducer 303.

(3) Rotary Drilling

In the working condition of rotary drilling, the adjuster 3 is in the unlocked condition, the main shaft 8 can be driven by the main motor 1 to rotate, and the main shaft 8 and the drill pipes can be driven by supplying oil to the main motor 1 to implement rotary drilling; at this time, the fluid medium is not supplied to the downhole motor 9 by the medium pump 6.

(4) Combined Drilling

In the working condition of combined drilling, the adjuster 3 is in the unlocked condition, and the main shaft 8 can be driven by the main motor 1 to rotate. At this time, the driving medium is supplied to the downhole motor 9 by the medium pump 6, thus to drive the downhole motor 9 to rotate, and then the drill pipes 7 are driven by the main motor 1 to rotate in order to achieve combined drilling.

Finally, it should be noted that the above embodiments are only used for describing, rather than limiting the technical solution of the present invention. Although the present invention is described in detail with reference to the preferred embodiments, those ordinary skilled in the art shall understand that the technical solution of the present invention can be amended or equivalently replaced without departing from the purpose and the scope of the technical solution. The amendment or equivalent replacement shall be covered within the scope of the claims of the present invention.

The invention claimed is:

1. A combined drilling system with double rotary driving devices, comprising a main motor, a gearbox, a main shaft, drill pipes and a downhole motor, wherein the gearbox is provided with a driving shaft, one end of the driving shaft is connected with the main motor, the driving shaft is engaged with the main shaft through a gear in the gearbox, the drill pipes are circumferentially and fixedly connected with the main shaft, and the downhole motor is arranged at a front end of the drill pipes to serve as a downhole drilling actuator; the present invention is characterized in that: the other end of the driving shaft is connected with an adjuster through the gearbox;

the adjuster comprises a transmission shaft, a fixed toothed disk, a moving toothed disk, a rotary seat and a rotary speed reducer with a self-locking function, one end of the transmission shaft is circumferentially and fixedly connected with the driving shaft, the fixed toothed disk and the moving toothed disk are sheathed on the transmission shaft, the fixed toothed disk is engaged with the moving toothed disk through skewed teeth, the fixed toothed disk is circumferentially and fixedly connected with the transmission shaft, the moving toothed disk is rotationally connected with the transmission shaft, and the moving toothed disk can slide along an axial direction of the transmission shaft;

the rotary seat is sheathed on and circumferentially and fixedly connected with the moving toothed disk, and an output disk of the rotary speed reducer is coaxially and fixedly connected with the rotary seat to transfer rotation of the output disk of the rotary speed reducer to the moving toothed disk.

2. The combined drilling system with double rotary driving devices as claimed in claim 1, characterized in that: the adjuster also comprises a driving piston and a connecting seat, the driving piston is sheathed on the transmission shaft and is located on one side of the fixed toothed disk away from the moving toothed disk, and one end of the driving piston away from the driving shaft is connected with the moving toothed disk;

the connecting seat is sheathed on the driving piston, an outer circle of the connecting seat is divided by three diameters, a middle section has a largest diameter, both end surfaces of the middle section are connected with the gearbox and the rotary speed reducer, respectively, to realize relative axial positioning among the gearbox, the connecting seat and the rotary speed reducer, and an inner diameter of the connecting seat is divided by three apertures, wherein the apertures of two sections away from the gearbox are matched with an outer diameter of the driving piston, and the two sections are sheathed on the driving piston;

the driving piston is a two-stage stepped shaft, a sealing groove is formed in an outer circle of a small-diameter end of the driving piston, a sealing ring is installed in the sealing groove and is matched with a corresponding position of the connecting seat sheathed on the driving piston to form a first seal, an outer circle of a large-diameter end is matched with a sealing ring installed at a corresponding position of the connecting seat to form a second seal, a sealing cavity located between the driving piston and the connecting seat is formed between the first seal and the second seal, an oil inlet communicated with the sealing cavity is arranged on the connecting seat, and the moving toothed disk is pushed by the driving piston to move in a direction away from the fixed toothed disk under the action of hydraulic oil entering the sealing cavity through the oil inlet to enable the moving toothed disk to slide along the axial direction of the transmission shaft.

3. The combined drilling system with double rotary driving devices as claimed in claim 2, characterized in that: the adjuster also comprises an end cover, the other end of the transmission shaft is rotationally connected in the end cover, the moving toothed disk is a disk-like part with a central through hole, the central through hole is a stepped through hole, one side of the stepped through hole facing the end cover is a large-diameter through hole, the moving toothed disk is sheathed on and slidably connected with the end cover through the large-diameter through hole, one end surface of the moving toothed disk facing the driving piston is provided with first skewed teeth distributed circumferentially, the fixed toothed disk is provided with second skewed teeth engaged with the first skewed teeth, and springs are arranged between an inner end surface of the large-diameter through hole and one end surface of the end cover opposite to the inner end surface to make the first skewed teeth and the second skewed teeth engaged under a thrust force of the springs;

an outer circular surface of the moving toothed disk is provided with lug bosses distributed uniformly, the rotary seat is sheathed on the moving toothed disk and has grooves matched with the lug bosses to be circumferentially and fixedly connected with the moving toothed disk, and one end of the rotary seat is provided with a rotary speed reducer connecting disk which is fixedly connected with the output disk of the rotary speed reducer to transfer the rotation of the output disk of the rotary speed reducer to the moving toothed disk.

4. The combined drilling system with double rotary driving devices as claimed in claim 3, characterized in that: a transmission piston is also arranged between the driving piston and the moving toothed disk, the transmission piston is sheathed on and slidably connected with the transmission shaft, one end of the transmission piston is connected with the driving piston, and the other end is connected with the moving toothed disk to transmit a thrust force of the driving piston.

5. The combined drilling system with double rotary driving devices as claimed in claim 3, characterized in that: the rotary seat is cylindrical, and one end of the rotary seat away from the rotary speed reducer connecting disk is provided with an end cover connecting disk which is fixedly connected with the end cover.

6. The combined drilling system with double rotary driving devices as claimed in claim 3, characterized in that: the fixed toothed disk is provided with a toothed disk and a fixed shaft located in a center of the toothed disk, the second skewed teeth are arranged on the toothed disk, the fixed shaft is inserted into the central through hole of the moving toothed disk, and a keyway is provided in the fixed shaft to enable the fixed toothed disk to be circumferentially and fixedly connected with the transmission shaft through key connection.

7. The combined drilling system with double rotary driving devices as claimed in claim 3, characterized in that: the end cover has a three-stage stepped hollow disk-like structure, which is sheathed on the transmission shaft through a bearing, a maximum outer diameter section of the end cover is provided with a flange which is connected with the rotary seat, the maximum outer diameter section is located on one end away from the driving shaft, an intermediate diameter section is used for carrying the rotary seat and limiting an axial movement distance of the moving toothed disk, a minimum diameter section is axially and slidably connected with the large-diameter through hole of the moving toothed disk, and one end surface of the minimum diameter section is provided with a plurality of spring mounting holes which are used for mounting the springs and distributed circumferentially and uniformly.

8. The combined drilling system with double rotary driving devices as claimed in claim 3, characterized in that: the driving shaft is arranged in the gearbox, one end surface of the middle section of the connecting seat is connected with the gearbox, one section of the connecting seat close to the gearbox is inserted into the gearbox and is used as an axial stop of the bearing sheathed on the driving shaft, and one section of the connecting seat close to the rotary speed reducer is extended towards an inner part of the rotary speed reducer to be used for installation and guidance of the rotary speed reducer.

9. The combined drilling system with double rotary driving devices as claimed in claim 1, characterized in that: one end of the drill pipes is connected with a medium pump, a fluid medium is input to the downhole motor by the medium pump through the drill pipes, and the rotary speed reducer is connected with an adjusting motor which drives the rotary speed reducer to rotate.

10. A control method for the combined drilling system with double rotary driving devices, characterized in that: the combined drilling system with double rotary driving devices as claimed in claim 1, and states of the adjuster, the main motor and the downhole motor are combined, so as to make the combined drilling system have four working conditions: sliding directional drilling, accurate angle adjustment, rotary drilling and combined drilling; the specific steps are as follows:

sliding directional drilling:
in the working condition of sliding directional drilling, sliding the moving toothed disk axially to make the fixed toothed disk engaged with the moving toothed disk through skewed teeth, thus to make the adjuster in a locked condition and make the main shaft cannot rotate under the drive of the main motor, and driving the downhole motor to rotate, thus to drive a drill bit to rotate and implement sliding directional drilling;

toolface azimuth adjustment:
in the working condition of toolface azimuth adjustment, sliding the moving toothed disk axially to make the fixed toothed disk engaged with the moving toothed disk through skewed teeth, thus to make the adjuster in the locked condition and make the main shaft cannot rotate under the drive of the main motor, and driving the transmission shaft to rotate by the rotary speed reducer, thus to drive the driving shaft to rotate by the transmission shaft, drive the main shaft and the drill pipes to rotate by the transmission shaft through the gearbox, and realize toolface azimuth adjustment;

rotary drilling:
in the working condition of rotary drilling, sliding the moving toothed disk axially to make the fixed toothed disk separated from the moving toothed disk, thus to make the adjuster in an unlocked condition and enable the main motor to drive the main shaft and the drill pipes to rotate and implement rotary drilling;

combined drilling:
in the working condition of combined drilling, sliding the moving toothed disk axially to make the fixed toothed disk separated from the moving toothed disk, thus to make the adjuster in the unlocked condition and enable the main motor to drive the main shaft and the drill pipes to rotate, and driving the downhole motor to rotate at the same time, thus to drive the drill bit to rotate and implement combined drilling.

* * * * *